Figure 1:
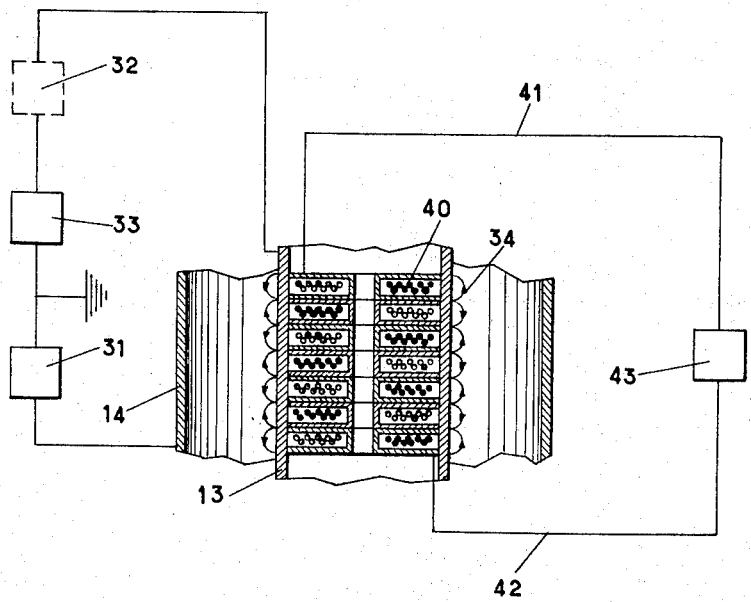

Nov. 2, 1965    G. J. BOUCHER    3,215,939
ELECTRONIC SWITCHING SYSTEM
Filed July 27, 1962

INVENTOR:
G.J. BOUCHER

BY Paul M. Craig, Jr.
ATTORNEY 3,215,939
ELECTRONIC SWITCHING SYSTEM
Gilbert Jules Boucher, Paris, France, assignor to CSF-Compagnie Generale de Telegraphie Sans Fil, Paris, France
Filed July 27, 1962, Ser. No. 212,893
Claims priority, application France, Sept. 7, 1961, 872,545
8 Claims. (Cl. 328—253)

The present invention relates to an electronic switching system, and more particularly to an electronically controlled gate of the type having two electrode elements of which one operates as a cathode and the other as an anode and which is provided with means for generating a magnetic field for selectively controlling the gating action of such device.

An electric current valve, constituted by a diode with preferably cold emission within a gaseous atmosphere at low pressure, particularly of cylindrical structure, and comprising means for producing a magnetic field having an axial component confined or localized to the vicinity of the hollow internal electrode of the cylindrical structure, with the generating system of the magnetic field located within this hollow structure, has been described in the copending application Serial No. 67,321, filed on November 4, 1960, by Gilbert Boucher and Michel Soulet, and assigned to the assignee of the present application, the contents of this prior application being incorporated herein by reference insofar as necessary.

In this application, there is also described the application of the electric current valve disclosed therein to alternating current rectifiers.

The object of the present invention is another modified application of the principle underlying such electric valve, particularly to electronically controlled gates interconnected into alternating current or direct current circuits.

The invention is based on the known phenomenon that within valves of the type described, the passage or blockage of the current depends on a certain threshold of the applied magnetic field.

According to the present invention, the generating system of the magnetic field for the described valve, is, therefore, subjected to a control signal which establishes an intensity of the magnetic field superior to the threshold in question, or to the contrary, lowers the intensity of the magnetic field below this threshold.

The valve, inserted into an alternating current or direct current circuit, operates as a gate of this circuit under the control of the control signal.

Accordingly, it is an object of the present invention to provide an electronic gating system which is simple in structure, relatively inexpensive in manufacture, and which is capable of sustaining the gating action thereof notwithstanding the application of relatively high voltages across the two terminals of the gate.

Still a further object of the present invention resides in the provision of a gating device for use with either alternating or direct current circuits which may be controlled in a simple manner without requiring elaborate circuitry for the control thereof.

Still another object of the present invention resides in the provision of an electronic gate of the type described hereinabove, which may be readily designed for the particular given values in any given application without modifications in the basic structure thereof.

Figure 2:
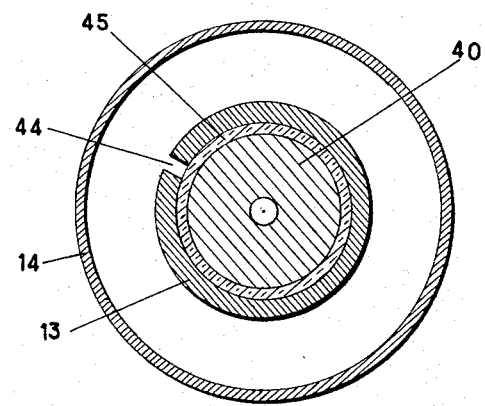

These and other objects, features and advantages of the present invention will become more obvious from the following description when taken in connection with the accompanying drawing which shows, for purposes of illustration only, two embodiments in accordance with the present invention, and wherein:

FIGURE 1 is a partial longitudinal cross sectional view of a valve structure and its circuit in accordance with the present invention which operates as an electronic gate, and FIGURE 2 is a transverse cross sectional view through a modified embodiment of a valve structure that may be utilized with the circuit of FIGURE 1.

Referring now to the drawing wherein like reference numerals are used throughout the two views to designate corresponding parts, only those broken away parts of the cylindrical walls forming the electrodes are shown therein which are believed adequate for a complete understanding of the present invention, the more so as the details of the structure of the valve of the type of interest to the present invention is fully described in the aforementioned copending application. In FIGURE 1, reference numeral 14 designates the wall portions forming part of the external cylindrically-shaped electrode and reference numeral 13 the wall portions of the cylindrically-shaped internal electrode, the electrodes 14 and 13 constituting effectively a diode and the space between these electrodes 14 and 13 being filled with a gas at low pressure. The generating system of the magnetic field used for purposes of controlling the gating action is located on the inside of the inner electrode 13, itself constituted by a hollow cylinder. In order to realize a suitable control, the generating system of the magnetic field is constituted by a system of relatively flat disk-shaped magnetic field producing elements 40 provided with windings connected in series and wound alternately in opposite directions as symbolically indicated in the drawing by the sections of the windings having alternately dark and light circles. Under these conditions, there is formed in proximity to the external surface of the electrode 13 a system of lines of force 34 as in the valve described in the aforementioned copending application. It may be seen that the magnetic field thus obtained has components parallel to the surfaces of electrodes 13 and 14 and that the intensity of this field is considerably stronger near electrode 13 than near electrode 14.

In principle, the operation of the valve structures, 13, 14, 40 of the present application is the same as that of the valve of the aforementioned application, and reference may be had to the theoretical explanations in said copending application for a more complete treatment of the operation.

According to the present invention, the supply leads 41 and 42 of the stack of magnetic field producing elements 40 are connected to a control signal source 43 which may supply a current sufficient to produce by means of the coils 40 a magnetic field such that the passage of current between the electrodes 13 and 14 is unblocked. The circuit closed by the passage of this current comprises a voltage source 31, a load 33, and eventually a filter 32 if the current source is an alternating-current source. If the current source 31 is a direct current source, and if the source 31 is connected to the electrode 14 as shown for purposes of illustration only in the schematic wiring diagram of FIGURE 1, then it is the positive pole of source 31 which is connected to the electrode 14 since the electrode 13 operates continuously as cathode.

The control signal from source 43 may be of the direct current or alternating current type. In the lattter case, to avoid the induction of eddy currents within the electrode 13, it will be advantageous to provide a longitudinal slot 44 as shown in FIGURE 2. To maintain the tightness of the interelectrode space, it will then be necessary to interpose between the electrode 13 and the coils 40 an insulating cylinder 45 which will be incorporated within the walls of the gas tight enclosure.

It may be readily seen from the foregoing description that under the control of the signal source 43 the valve behaves as an electronic gate for the circuit of the source 31 which discharges through the load 33.

While I have shown and described two embodiments in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A current circuit comprising, in a series circuit, a current source, a load, and an electronic gate for the current of said source through said load, said gate being constituted by an electric current valve including a pair of essentially parallel mutually facing electrodes connected respectively to said source and said load whereby an electric field is established in the space between said electrodes, one of said electrodes operating as anode and the other as cold-emissive cathode, a rarified gas substance within said space, magnetic field generating means for generating within said space a magnetic field having at least a component essentially parallel to the surfaces of said electrodes and an intensity which is higher near said cathode than near said anode and has an abrupt variation in magnitude at a distance nearer to the cathode than to the anode, and control means operatively connected with said magnetic field generating means for selectively varying said magnetic field strength sufficiently to produce a gating effect on the current through said valve, said magnetic field generating means including a longitudinal stack of series connected coils alternately wound in opposite senses such that the successive coils produce oppositely directed magnetic fields, and said control means being interconnected in the energizing circuit for said series connected coils.

2. A current circuit comprising, in a series circuit, a current source, a load, and an electronic gate for the current of said source through said load, said gate being constituted by an electric current valve including a pair of essentially parallel mutually facing electrodes connected respectively to said source and said load whereby an electric field is established in the space between said electrodes, one of said electrodes operating as anode and the other as cold-emissive cathode, said electrodes being cylindrical and coaxial to each other, a rarified gas substance within said space, magnetic field generating means for generating within said space a magnetic field having at least a component essentially parallel to the surfaces of said electrodes and an intensity which is higher near said cathode and near said anode, and has an abrupt variation in magnitude at a distance nearer to the cathode than to the anode and control means operatively connected with said magnetic field generating means for selectively varying said magnetic field strength sufficiently to produce a gating effect on the current through said valve, said magnetic field generating means including a longitudinal stack of series connected coils alternately wound in opposite senses such that the successive coils produce oppositely directed magnetic fields, and said control means being interconnected in the energizing circuit for said series connected coils.

3. A current circuit comprising, in a series circuit, a current source, a load, and an electronic gate for the current of said source through said load, said gate being constituted by an electric current valve including a pair of essentially parallel mutually facing electrodes connected respectively to said source and said load whereby an electric field is established in the space between said electrodes, one of said electrodes operating as anode and the other as cold-emissive cathode, said electrodes being cylindrical and coaxial to each other, a rarified gas substance within said space, the internal electrode being hollow, magnetic field generating means located within said hollow internal electrode for generating within said space a magnetic field having at least a component essentially parallel to the surfaces of said electrodes and an intensity which is higher near said cathode than near said anode and has an abrupt variation in magnitude at a distance nearer to the cathode than to the anode, and control means operatively connected with said magnetic field generating means for selectively varying said magnetic field strength sufficiently to produce a gating effect on the current through said valve, said magnetic field generating means including a longitudinal stack of series connected coils alternately wound in opposite senses such that the successive coils produce oppositely directed magnetic fields, and said control means being interconnected in the energizing circuit for said series connected coils.

4. A current circuit comprising, in a series circuit, a current source, a load, and an electronic gate for the current of said source through said load, said gate being constituted by an electric current valve including a pair of essentially parallel mutually facing electrodes connected respectively to said source and said load whereby an electric field is established in the space between said electrodes, one of said electrodes operating as anode and the other as cold-emissive cathode, said electrode being cylindrical and coaxial to each other, a rarified gas substance within said space, magnetic field generating means for generating within said space a magnetic field having at least a component essentially parallel to the surfaces of said electrodes and an intensity which is higher near said cathode than near said anode and has an abrupt variation in magnitude at a distance nearer to the cathode than to the anode, and control means operatively connected with said magnetic field generating means for selectively varying said magnetic field strength sufficiently to produce a gating effect on the current through said valve, said control means including an alternating current source, the internal one of said coaxial electrodes being hollow and provided with means including a slot in the wall thereof for reducing eddy currents in said internal electrode, and insulating wall means on the inside of said last-mentioned electrode to complete the vacuum-tightness of the enclosure of said valve, said magnetic field generating means including a longitudinal stack of series connected coils alternately wound in opposite senses such that the successive coils produce oppositely directed magnetic fields, and said control means being interconnected in the energizing circuit for said series connected coils.

5. In a current circuit provided with a series connection of a current source, of a load and of an electronic gate for the current flowing from said source through said load, the improvement essentially consisting of a selectively controlled electronic current valve forming part of said gate and including a pair of essentially parallel, mutually facing electrodes connected respectively to said source and said load whereby an electric field is established in the space between said electrodes, one of said electrodes operating as anode and the other as cathode, a rarified gas substance being provided in the space between said electrodes, magnetic field generating means for generating within said space a magnetic field having at least a component essentially parallel to the surfaces of the electrodes and an intensity which is higher near said cathode than near said anode and has an abrupt variation in magnitude at a distance nearer to the cathode than to the anode, and control means for said magnetic field generating means to produce a gating effect on the current through said valve by varying the magnetic field strength produced thereby, said magnetic field generating means including a longitudinal stack of series connected coils alternately wound in opposite senses such that the successive coils produce oppositely directed magnetic fields, and said control means interconnected in the energizing circuit for said series connected coils.

6. A current circuit comprising, in a series circuit, a current source, a load, and an electronic gate for the current of said source through said load, said gate being constituted by an electric current valve including a pair of essentially parallel mutually facing electrodes connected respectively to said source and said load whereby an electric field is established in the space between said electrodes, one of said electrodes operating as anode and the other as cold-emissive cathode, said electrodes being cylindrical and coaxial to each other, a rarified gas substance within said space, the internal electrode being hollow, magnetic field generating means located within said hollow internal electrode for generating within said space a magnetic field having at least a component essentially parallel to the surfaces of said electrodes and an intensity which is higher near said cathode than near said anode and has an abrupt variation in magnitude at a distance nearer to the cathode than to the anode, and control means operatively connected with said magnetic field generating means for selectively varying said magnetic field strength sufficiently to produce a gating effect on the current through said valve, said magnetic field generating means including a longitudinal stack of series connected coils alternately wound in opposite senses such that the successive coils produce oppositely directed magnetic fields, and said control means being interconnected in the energizing circuit for said series connected coils, said control means including an alternating current source, the internal one of said coaxial electrodes being hollow and provided with means including a slot in the wall thereof for reducing eddy currents in said internal electrode, and insulating wall means on the inside of said last-mentioned electrode to complete the vacuum-tightness of the enclosure of said valve.

7. In a current circuit provided with a series connection of a current source, of a load and of an electronic gate for the current flowing from said source through said load including a pair of essentially parallel, mutually facing electrodes connected respectively to said source and said load whereby an electric field is established in the space between said electrodes, one of said electrodes operating as anode and the other as cathode, a rarified gas substance being provided in the space between said electrodes and magnetic field generating means for generating within said space a magnetic field having at least a component essentially parallel to the surfaces of the electrodes and an intensity which is higher near said cathode than near said anode and has an abrupt variation in magnitude at a distance nearer to the cathode than to the anode, the improvement essentially consisting of control means operatively connected with said magnetic field generating means to produce a gating effect on the current through said valve by varying the magnetic field strength produced thereby, said magnetic field generating means including a longitudinal stack of series connected coils alternately wound in opposite senses such that the successive coils produce oppositely directed magnetic fields, and said control means being interconnected in the energizing circuit for said series connected coils.

8. In a current circuit provided with a series connection of a current source, of a load and of an electronic gate for the current flowing from said source through said load including a pair of essentially parallel, mutually facing electrodes connected respectively to said source and said load whereby an electric field is established in the space between said electrodes, one of said electrodes operating as anode and the other as cathode, a rarified gas substance being provided in the space between said electrodes and magnetic field generating means for generating within said space a magnetic field having at least a component essentially parallel to the surfaces of the electrodes and an intensity which is higher near said cathode than near said anode and has an abrupt variation in magnitude at a distance nearer to the cathode than to the anode, the improvement essentially consisting of control means operatively connected with said magnetic field generating means to produce a gating effect on the current through said valve by varying the magnetic field strength produced thereby including an alternating current source for said magnetic field generating means, said one electrode being provided with slot means to reduce eddy currents therein and with substantially non-magnetic seal means associated therewith to nullify the effect of said slot means as regards the gas-tightness of the enclosure of the valve of said gate, said magnetic field generating means including a longitudinal stack of series connected coils alternately wound in opposite senses such that the successive coils produce oppositely directed magnetic fields, and said control means being interconnected in the energizing circuit for said series connected coils.

References Cited by the Examiner
UNITED STATES PATENTS

| | | | |
|---|---|---|---|
| 1,669,154 | 5/28 | Baker | 328—253 X |
| 1,714,405 | 5/29 | Smith | 313—161 |
| 2,235,517 | 3/41 | Espe | 313—157 X |
| 2,352,231 | 6/44 | Stratton | 328—253 X |
| 2,448,527 | 9/48 | Hansell | 313—157 X |
| 2,478,446 | 8/49 | Alfven | 313—161 X |
| 2,615,139 | 10/52 | Coleman. | |
| 2,662,980 | 12/53 | Schwede | 313—157 X |

DAVID J. GALVIN, *Primary Examiner.*

JAMES D. KALLAM, *Examiner.*